(12) United States Patent
Fang

(10) Patent No.: US 11,096,141 B2
(45) Date of Patent: Aug. 17, 2021

(54) LOCATION INFORMATION DETERMINATION BASED ON TIMING MEASUREMENTS IN WIRELESS NETWORKS

(71) Applicant: ZTE Corporation, Guangdong (CN)

(72) Inventor: Yonggang Fang, San Diego, CA (US)

(73) Assignee: ZTE Corporation, Guangdong (CN)

(*) Notice: Subject to any disclaimer, the term of this patent is extended or adjusted under 35 U.S.C. 154(b) by 163 days.

(21) Appl. No.: 16/114,098

(22) Filed: Aug. 27, 2018

(65) Prior Publication Data

US 2020/0068521 A1 Feb. 27, 2020

(51) Int. Cl.

| | |
|---|---|
| *H04W 64/00* | (2009.01) |
| *G01S 3/50* | (2006.01) |
| *G01S 7/4865* | (2020.01) |
| *H04J 3/06* | (2006.01) |
| *H04B 17/364* | (2015.01) |

(Continued)

(52) U.S. Cl.
CPC ............ *H04W 64/003* (2013.01); *G01S 3/50* (2013.01); *G01S 7/4865* (2013.01); *H04B 17/364* (2015.01); *H04J 3/0667* (2013.01); *H04J 1/06* (2013.01); *H04L 43/0864* (2013.01)

(58) Field of Classification Search
CPC ..... G01S 5/186; A01G 25/167; H02J 13/0086
See application file for complete search history.

(56) References Cited

U.S. PATENT DOCUMENTS 4,847,781 A * 7/1989 Brown, III .......... H02J 13/0086
  700/296
8,842,571 B1 * 9/2014 Yu ....................... H04L 43/0852
  370/252

(Continued)

FOREIGN PATENT DOCUMENTS

| CN | 105492922 A | 4/2016 |
|---|---|---|
| CN | 107076829 A | 8/2017 |

(Continued)

OTHER PUBLICATIONS

International Search Report and Written Opinion for International Patent Application No. PCT/CN2019/100158, dated Nov. 1, 2019 (9 pages).

*Primary Examiner* — Bernarr E Gregory
(74) *Attorney, Agent, or Firm* — Perkins Coie LLP

(57) ABSTRACT

Method, systems and devices for location information determination based on timing measurements are described. One example method includes transmitting, by a communication apparatus, a timing request to a plurality of network devices, where the timing request comprises a respective expected response time for each of the plurality of network devices, receiving, at a plurality of times, a plurality of timing measurements from each of the plurality of network devices, wherein each of the plurality of times is based on the corresponding expected response time, and the plurality of timing measurements comprises a respective time of arrival (ToA) timestamp and a respective time of departure (ToD) timestamp, and determining a location information of the communication apparatus based on an estimate of a round trip delay that is computed using a difference of the respective ToA and ToD timestamps from the plurality of timing measurements.

21 Claims, 12 Drawing Sheets

(51) Int. Cl.
*H04J 1/06* (2006.01)
*H04L 12/26* (2006.01)
*H04J 3/00* (2006.01)

(56) References Cited

U.S. PATENT DOCUMENTS

| | | | | |
|---|---|---|---|---|
| 9,226,260 | B2* | 12/2015 | Steiner | H04W 64/00 |
| 9,277,369 | B2* | 3/2016 | Lindskog | H04W 64/00 |
| 9,459,337 | B2* | 10/2016 | Aldana | H04W 64/00 |
| 10,039,073 | B2* | 7/2018 | Kakani | H04W 64/00 |
| 10,182,413 | B2* | 1/2019 | Cheng | H04W 64/00 |
| 2004/0090345 | A1* | 5/2004 | Hitt | A01G 25/167 |
| | | | | 340/870.11 |
| 2013/0336131 | A1 | 12/2013 | Zhang | |
| 2014/0073352 | A1 | 3/2014 | Aldana | |
| 2014/0315582 | A1* | 10/2014 | Dong | H04W 64/00 |
| | | | | 455/456.2 |

FOREIGN PATENT DOCUMENTS

| | | | | |
|---|---|---|---|---|
| CN | 107079399 A | | 8/2017 | |
| GB | 2354073 A | * | 3/2001 | ............ G01S 5/186 |
| WO | 2017074748 A | | 4/2017 | |

* cited by examiner

| Element ID | Length | HE MAC Capability Information | HE PHY Capability Information | ... | MU-TM supported |
|---|---|---|---|---|---|

FIG. 6A

| Element ID | Length | ... | BSSID | BSS Information |
|---|---|---|---|---|

| AP Reachability | Security | ... | FTM | MU-TM Supported | Reserved |
|---|---|---|---|---|---|

LOCATION INFORMATION DETERMINATION BASED ON TIMING MEASUREMENTS IN WIRELESS NETWORKS

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, therein requiring improved location and measurement accuracy and efficiency.

SUMMARY

This document relates to methods, systems, and devices for location information determination based on timing measurements, which enable a wireless station to determine its location when, for example, GPS is not available.

In one exemplary aspect, a wireless communication method is disclosed. The method includes transmitting, by a communication apparatus, a timing request to a subset of a plurality of network devices, where the timing request comprises a respective expected response time for each of the subset of the plurality of network devices, receiving, at a plurality of times, a plurality of timing measurements from each of the subset of the plurality of network devices, where each of the plurality of times is based on the corresponding expected response time, and the plurality of timing measurements comprises a respective time of arrival (ToA) timestamp and a respective time of departure (ToD) timestamp, and determining a location information of the communication apparatus based on an estimate of a round trip delay that is computed using a difference of the respective ToA and ToD timestamps from the plurality of timing measurements.

In another exemplary aspect, a wireless communication method is disclosed. The method includes transmitting a plurality of initial timing requests to a plurality of network devices, receiving a plurality of initial timing responses from a subset of the plurality of network devices, transmitting a timing request to the subset of the plurality of network devices, where the timing request identifies transmission resources to be used by each of the subset of the plurality of network devices, receiving, over the respective transmission resources, a plurality of timing measurements from the subset of the plurality of network devices, where the plurality of timing measurements comprises a respective ToA timestamp and a respective ToD timestamp, and determining a location information of the apparatus based on an estimate of a round trip delay that is computed using a difference of the respective ToA and ToD timestamps from the plurality of timing measurements.

In yet another exemplary aspect, a wireless communication method is disclosed. The method includes transmitting, to a group of network devices, a timing request soliciting time measurement responses, the timing request including information for receiving the time measurement responses in a collision-free manner, receiving, in the collision-free manner, the timing measurement responses from at least some network devices from the group, where each timing measurement response includes a first field indicative of a reception time at which a corresponding network device received the timing request and a second field indicative of response time at which the corresponding network device transmitted its timing measurement response, and determining a location of the communication apparatus based on the timing measurement responses.

In yet another exemplary aspect, a wireless communication method is disclosed. The method includes receiving, from a communication apparatus, a timing request comprising a first ToD, an expected response time (ERT), and an identification of a transmission resource, and transmitting, at a calculated time and over the transmission resource, a timing measurement that comprises a ToA timestamp and a second ToD timestamp, wherein the ToA timestamp corresponds to when the timing request was received, wherein the second ToD timestamp corresponds to the calculated time, and wherein the second ToD is equal to a sum of the ToA timestamp and the expected response time.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 6A and 6B show examples of MU-TM support indication in an HE Capability IE and a Neighbour BSS report IE, respectively.

DETAILED DESCRIPTION

Figure 1:
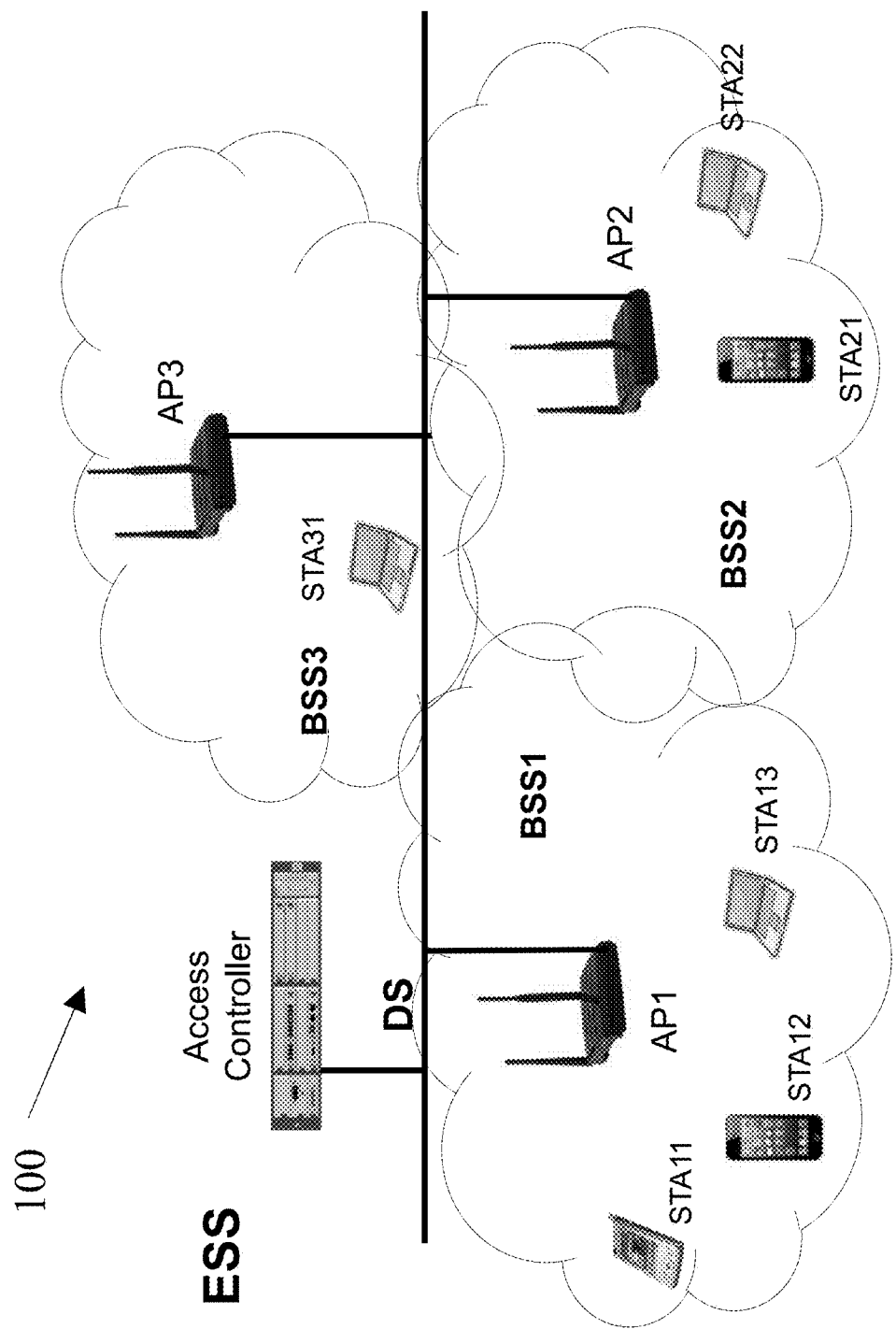
FIG. 1 shows an example of an enhanced service set (ESS) including multiple basic service sets (BSS) in a distributed system.

Wireless communication systems can include a network of one or more access points (APs) to communicate with one or more wireless stations (STAs). An AP can emit radio signals that carry management information, control information or users' data to one or more wireless stations, and a station can also transmit radio signals to the access point in the same frequency channel via time division duplexing (TDD) or in a different frequency channel via frequency division duplexing (FDD).

IEEE 802.11 is an asynchronous time division duplexing technology used by a wireless local area network (WLAN). The basic unit of WLAN is called a basic service set (BSS). An infrastructure BSS is the BSS with stations that communicate through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

The Global Positioning System (GPS) is a widely used positioning mechanism in wireless communication systems and consumer products. To get the geo-positioning information, the GPS receiver receives signals from at least four GPS satellites. This GPS mechanism may work well in outdoor cases, but not well for indoor environments as the signals from GPS satellites are too weak to penetrate indoors for the GPS receiver to acquire and synchronize with. Therefore, it is beneficial to have geo-positioning mechanisms other than GPS for indoor and/or outdoor environment.

Typical geo-positioning mechanisms for the indoor environment include Wi-Fi-based received signal strength indication (RSSI) measurements and Time of Arrival (ToA) measurements. The RSSI-based method leverages the characteristics of radio signal transmission decay as travelling, and uses the measured RSSI to derive the distance between the transmitter and receiver. On the other hand, ToA-based methods rely on the timing measurement from the initiating station transmitting the measurement signal to receiving the response signal sent from the responding station. Due to space limitations in an indoor environment, the timing measurement method should be very precise, otherwise the timing measurement error may render the measurement results unusable.

A single RSSI or ToA measurement from a reference station cannot be used to determine the position of requesting station precisely. In order to accurately determine the location of a station, multiple distance measurements to multiple reference stations (e.g., APs), whose geo-locations are known in advance, may be required. With multiple measured RSSI or ToA information, a positioning mechanism (e.g., triangulation or fingerprinting) can be used to locate the station that is communicating with those reference stations.

In dense network deployments, however, multiple measurements would reduce the efficiency of the medium/resource usage and may cause air-link traffic congestion when many stations attempt to get their location information.

FIG. 1 illustrates an example of a wireless communication system 100. BSS1, BSS2 and BSS3 are infrastructure BSSs. BSS1 consists of one access point (API) and several non-AP stations, STA11, STA12, and STA13. The AP1 maintains associations with, e.g., maintains a wireless connectivity or reserves wireless communication resources for, stations STA11, STA12, and STA13. BSS2 consists of one access point (AP2) and two non-AP stations, STA21 and STA22. The AP2 maintains associations with stations STA21 and STA22. BSS3 contains one access point (AP3) and one non-AP stations, STA31. The AP3 maintains associations with stations STA31. Infrastructure BSS1, BSS2 and BSS3 may be interconnected via the AP1, AP2, and AP3 or connected to a switch/gateway through a distribution system (DS), and form as an Enhanced Service Set (ESS). An ESS may be managed and controlled by an access controller (AC). Embodiments of the disclosed technology may be implemented, for example, in a system such as described in FIG. 1.

Figure 2:
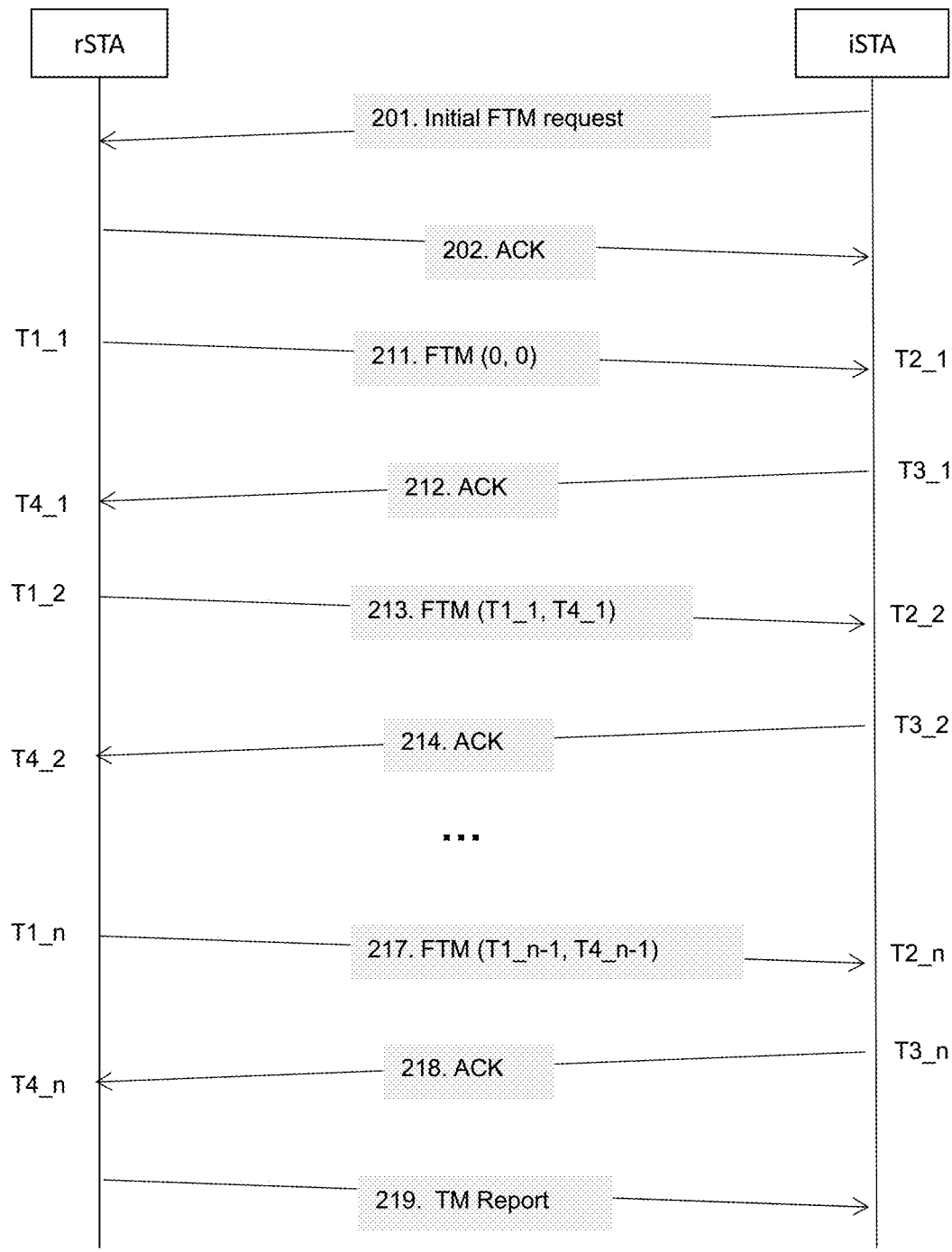
FIG. 2 shows an example of a message exchange for a fine timing measurement.

FIG. 2 illustrates an example of fine timing measurement (FTM) procedure defined by IEEE 802.11 specification, which allows a station to measure its distance to another station. In an example, the FTM may include the following steps:

201. The initiating station iSTA sends the initial FTM request to start the fine timing measurement procedure.
202. The responding station rSTA sends an ACK to confirm the agreement of fine timing measurement.
211. The rSTA sends the first FTM frame with the time stamp at which the FTM frame is transmitted (T1_1). The iSTA captures the time at which the FTM frame arrives (T2_1).
212. The iSTA responds the first FTM frame with an ACK frame at the time (T3_1). The rSTA captures the time at which the ACK frame arrives (T4_1).
213. The rSTA may start sending another (second) FMT frame with the time stamp T1_1 at which the first FTM frame was sent and T4_1 at which the first ACK was received. The iSTA captures the time at which the second FTM frame arrives (T2_2).
214. The iSTA responds the second FTM frame with an ACK frame (T3_2). The rSTA receives the ACK and captures the time at which the ACK frame arrives (T4_2).
217. Similarly, the rSTA may repeat the fine time measurement procedure via sending the nth FTM frame.
218. The iSTA responds the nth FMT frame with an ACK frame.
219. After receiving the final FTM/ACK, rSTA can calculate the traveling time between iSTA and rSTA using the multiple measurements, based on:

$$T=\text{Sum}[(T4\_i-T1\_i)-(T3\_i-T2\_i)]/2n, \text{ where } i=1 \ldots n.$$

The rSTA then sends a TM Report to the iSTA.

The procedure described in FIG. 2, however, suffers from drawbacks that results in decreases efficiency and more traffic. These drawbacks include:

(A) FTM is a point-to-point (P2P), single user protocol. For each timing measurement exchange, it can only get one pair of Time of Departure (ToD) and ToA timestamps. In order to improve the accuracy of measurement and reduce the variance of measurement, the P2P stations are required to perform FTM message exchanges multiple times. But this reduces the efficiency of the medium, especially for dense indoor deployment.

For each P2P measurement, an FTM, an ACK frame plus a Short Interframe Space (SIFS) time are required. The SIFS is the time between the time of detecting medium from busy to idle and the time of the transmitter sending a frame. It includes the RX PHY delay, RX/TX turnaround time, MAC processing delay. When the station receives a FTM frame and is going to send an ACK frame, or the station will start the next FTM frame after receiving an ACK frame, the delay time is at least a SIFS time. For example, the SIFS time (aSIFSTime) is 10 μs for 802.11n in 2.4 GHz, and 16 μs for 5 GHz. If multiple (e.g., N) FTM sessions are performed for timing measurement, the consumed air time is N×(time of transmitting FTM+aSIFSTime+time of transmitting ACK).

(B) One P2P timing measurement cannot provide the location information of the station. It requires at least three P2P timing measurements with different stations, i.e. via triangulation positioning to get the location of the initiating station to the reference points. Therefore an initiating station is required to have multiple sequential FTM sessions with different responding stations. This would result in some delays for final geo-positioning. If one FTM measurement duration is about 20 ms for each P2P measurement session, the total duration for FTM based positioning mechanism per one location request is at least 60 ms, which does not include the capability exchange time. When many stations request to provide the positioning information for navigation or other services, it would not only cause the delay of measurements but also consume a lot of air-time just for the FTM message exchanges.

(C) The accuracy of FTM mechanism is related to the channel bandwidth used in the timing measurement, as the timing measurement fluctuation varies as the radio channel change. For the channel with bandwidth of 20 MHz, the timing measurement accuracy is about 4 ns which is equivalent to the distance resolution of around 1.2 m; while for the channel with bandwidth of 160 MHz, the accuracy of timing measurement increases to around 0.5 ns, which is equivalent to the distance resolution of 0.15 m. Therefore, in order to improve the timing measurement accuracy, it is necessary to use wider bandwidth for FTM session. But this would also cause a medium usage efficiency issue especially in the dense deployment.

Embodiments of the disclosed technology improve, among other things, the efficiency of timing measurement via point-to-multi-point timing measurement exchanges, e.g., the multi-user timing measurement (MU-TM) protocol.

Figure 3:
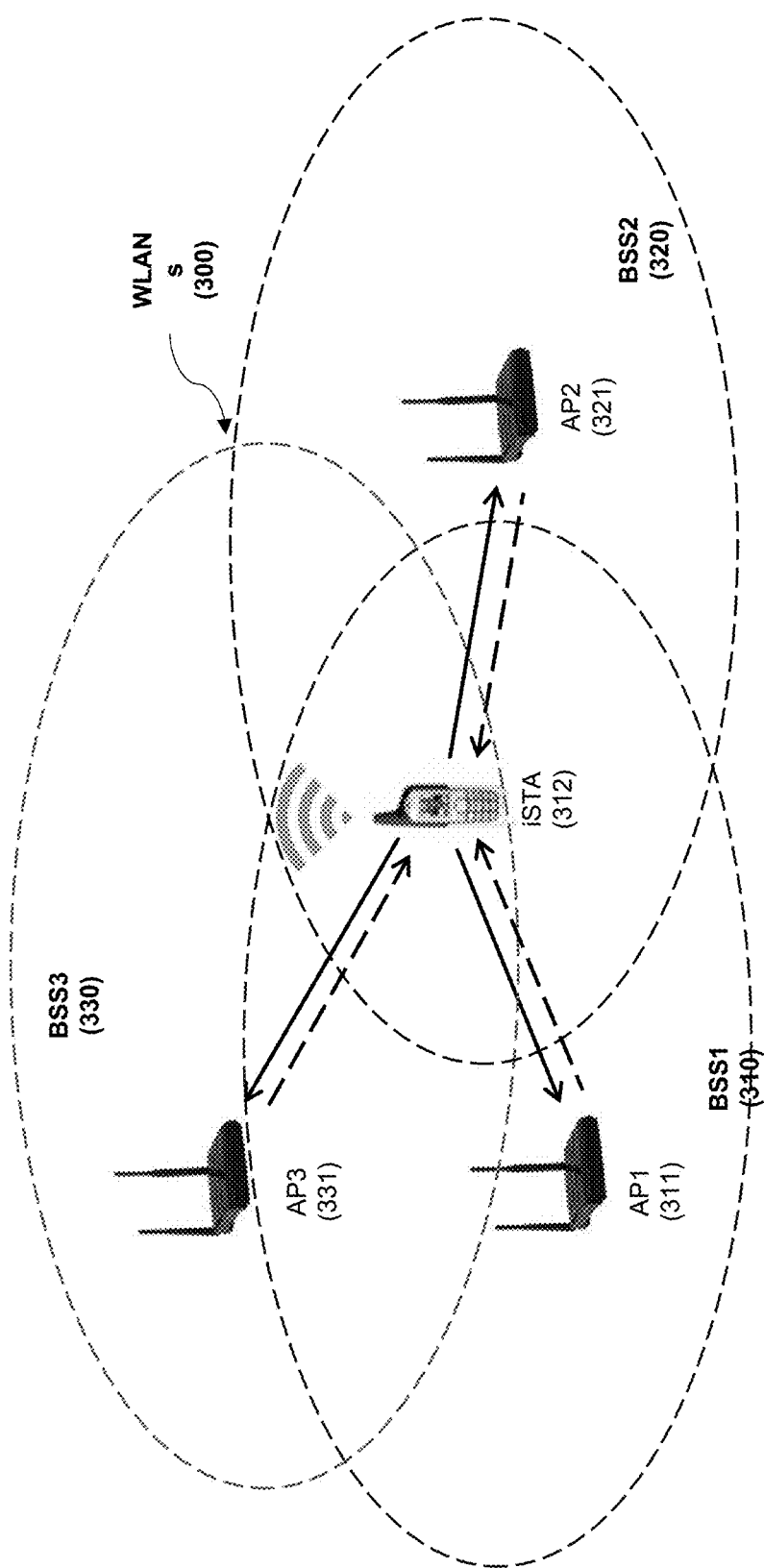
FIG. 3 shows an example of a Wi-Fi network with multi-user timing measurement (MU-TM)-based positioning.

FIG. 3 shows an example of WLANs for multi-user timing measurement protocol. A wireless communication network (300) in the example includes three Access Points (APs) 311, 321, and 331, which form three BSSs 310, 320, and 330 respectively. The WLAN 300 also contains one wireless station (312) which may associate with AP1 311 in this example. Three BSSes may be overlapped in the coverage area so that the wireless station (312) could be able to receive/transmit the radio signal from/to those APs, 311, 321 and 331.

The APs 311, 321 and 331 are MU-TM capable access points and broadcast the MU-TM capability information in the management frame periodically or per-request, such as beacon frames, probe response frames, etc. Those APs are operating in the same frequency channel and may support wider bandwidth such as 80 MHz or 160 MHz in addition to 20 MHz bandwidth.

The station 312 is in the coverage area of three BSSs. It can receive the management and other types of frames from all the APs 311, 321 and 331. The APs broadcast the MU-TM capability indication in the management frames such as beacon frames. If the station 312 receives the management frames of APs and knows that MU-TM are supported, it may perform the MU-TM based message exchanges with the APs 311, 321 and 331 for the geo-positioning. The station 312 may also acquire the local map, floorplan and other geographic reference information from APs 311, 321 and 331 so that it can determine its relative position to those reference points.

Figure 4:
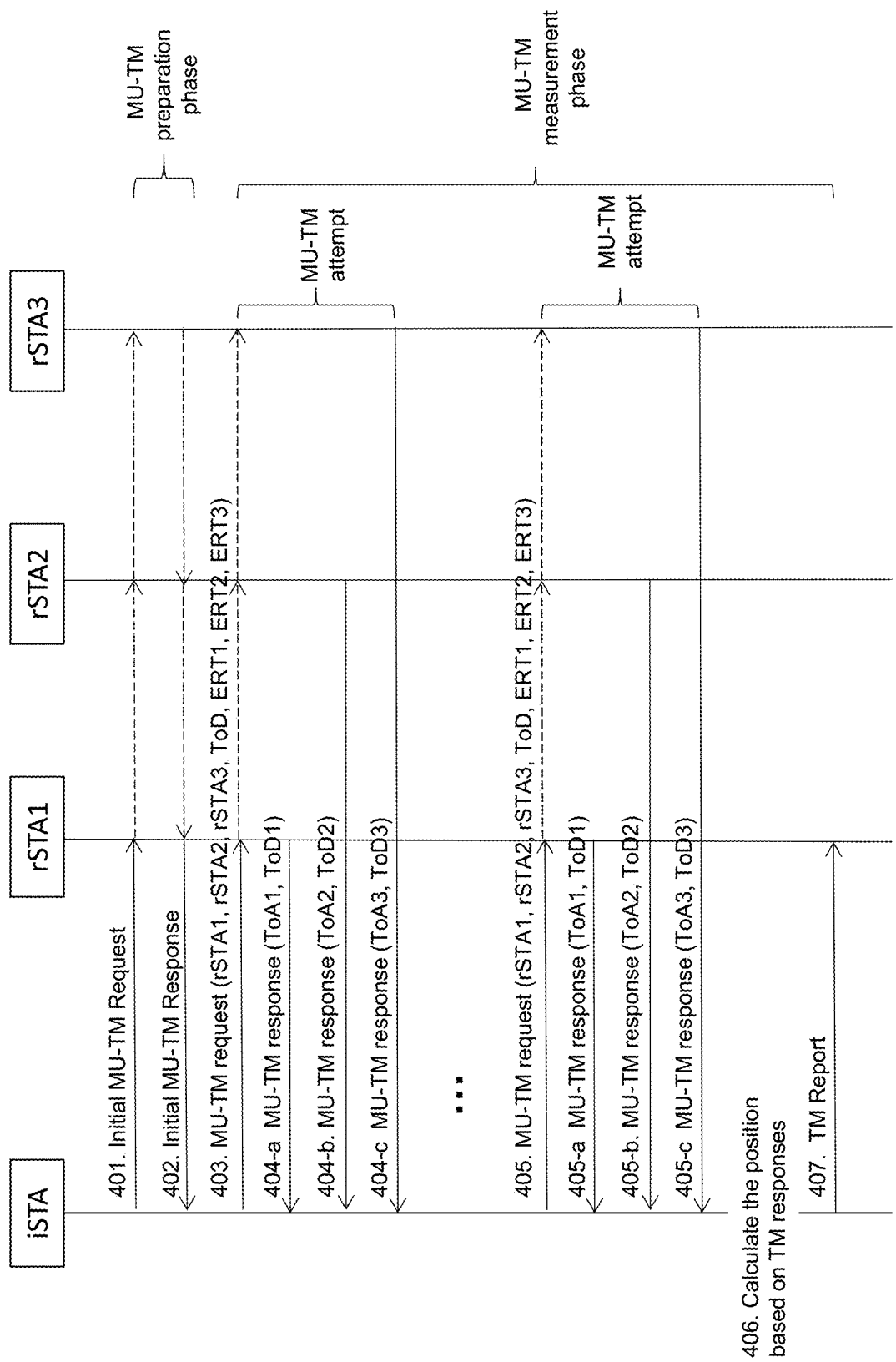
FIG. 4 shows an example of a message exchange for the MU-TM protocol.

FIG. 4 illustrates an example of message exchanges of the MU-TM protocol. In this example, the timing measurement for geo-positioning involves one initiating station (iSTA), and three responding stations (rSTA1), (rSTA2) and (rSTA3). The responding stations could be Access Points (APs) or other stations which could provide references of geo-location for the iSTA to determine its position from MU-TM measurements.

MU-TM protocol message exchanges may consist of two phases:

MU-TM preparation phase: In this phase, the MU-TM initiating station searches, identities MU-TM capable responding stations in the coverage area. The MU-TM initiating station exchanges the message with MU-TM capable responding stations to establish the multi-user timing measurement opportunity (MU-TM OP) for the MU-TM measurement phase. Other stations will set up NAV to prevent from interfering the timing measurement performed by the initiating and responding stations during the MU-TM measurement phase.

MU-TM measurement phase: In this phase, the MU-TM initiating station performs the timing measurement with multiple MU-TM capable responding stations to measure the round trip delays (RTDs) between them. The MU-TM measurement phase may have multiple MU-TM attempts to improve the timing measurement accuracy, each of which consists of one MU-TM Request from iSTA and multiple MU-TM Responses from different rSTA such as rSTA1, rSTA2 and rSTA3 in the example of FIG. 4.

During the MU-TM preparation and measurement phases, the responding stations rSTA1, rSTA2 and rSTA3 may use the timing reference transmitted in iSTA for fine timing synchronization. The detail of an exemplary MU-TM message exchanges is as follows:

401. The iSTA scans the nearby stations for the support of MU-TM capability, and sends an initial MU-TM Request in the broadcast or multi-cast mode addressing to those stations, i.e. rSTA1, rSTA2, rSTA3, to establish the multi-user timing measurement opportunity. The iSTA should include the multi-user timing measurement duration in the initial MU-TM Request for other stations to calculate MU-TM Opportunity.

402. The MU-TM capable responding stations, i.e. rSTA1, rSTA2, rSTA3, receive the initial MU-TM Request and respond with the initial MU-TM Response to confirm the multi-user timing measurement if they can perform MU-TM message exchanges with iSTA for the geo-positioning. Other stations receiving the initial MU-TM Request/Response shall set the NAV to MU-TM OP for preventing from transmissions during the MU-TM measurement phase.

403. After receiving the initial MU-TM Response from the responding stations, the initiating station iSTA sends a MU-TM Request (the first attempt) addressing to rSTA1, rSTA2 and rSTA3, with the Expected Responding Time (i.e. ERT1, ERT2, ERT3) respectively. The ERT of rSTA is the expected Time of Departure (ToD) of MU-TM Response which is used for distributing transmission of MU-TM Response from different rSTA to avoid the transmission collision. The iSTA also includes the ToD stamp of MU-TM Request in the MU-TM Request message.

404-a. When the MU-TM responding station (rSTA1) receives the MU-TM Request, it sends back the MU-TM Response to iSTA, including the Time of Arrival (ToA1) of receiving the MU-TM Request and Time of Departure (ToD1) of MU-TM Response, at its expected responding time. The rSTA1 calculates ToD1 via the formula: ToD1=ToA1+ERT1.

404-b. When the MU-TM responding station (rSTA2) receives the MU-TM Request, it sends back the MU-TM Response to iSTA, including the Time of Arrival (ToA2) of receiving the MU-TM Request and Time of Departure (ToD2) of MU-TM Response, at its expected responding time. The rSTA2 calculates ToD2 via the formula: ToD2=ToA2+ERT2.

404-c. When the MU-TM responding station (rSTA3) receives the MU-TM Request, it sends back the MU-TM Response to iSTA, including the Time of Arrival (ToA3) of receiving the MU-TM Request and Time of Departure (ToD3) of MU-TM Response, at its expected responding time. The rSTA3 calculates ToD3 via the formula: ToD3=ToA3+ERT3.

405. The iSTA and rSTA1, rSTA2, rSTA3 may repeat the MU-TM attempt for a couple of times to improve the accuracy of timing measurement, as shown in 404, 404-a, 404-b and 404-c. By the repetition of the timing measurements, the geo-positioning for iSTA could be updated and improved progressively.

406. With the timing measurement results from multiple MU-TM attempts, the iSTA can calculate the RTD between iSTA with rSTA1 as follows:

$$RTD1=Sum[(ToA(i)-ToD(i))-(ToD1(i)-ToA1(i))]/N.$$

Here, i is the MU-TM attempt in (1, . . . , N);

ToA(i) is the ith Time of Arrival of receiving MU-TM Response from rSTA1;

ToD1(i) is the ith Time of Departure for MU-TM Response from rSTA1;

ToA1(i) is the ith Time of Arrival of receiving MU-TM Request by rSTA1; and

ToD(i) is the ith Time of Departure of sending MU-TM Request from iSTA.

Similarly, iSTA can calculate the RTD between iSTA and rSTA2, iSTA and rSTA3 respectively:

$$RTD2=Sum[(ToA(i)-ToD(i))-(ToD2(i)-ToA2(i))]/N,$$
and $$RTD3=Sum[(ToA(i)-ToD(i))-(ToD3(i)-ToA3(i))]/N.$$

The iSTA may stop sending further MU-TM attempt if the difference between RTD1(n) and RTD1(n−1), RTD2(n) and RTD2(n−1) and RTD3(n) and RTD3(n−1) are less than a threshold. In other embodiments, the differences may be compared to distinct thresholds.

407. The iSTA may optionally send the MU-TM report including its location information to the associated station.

Figure 5:
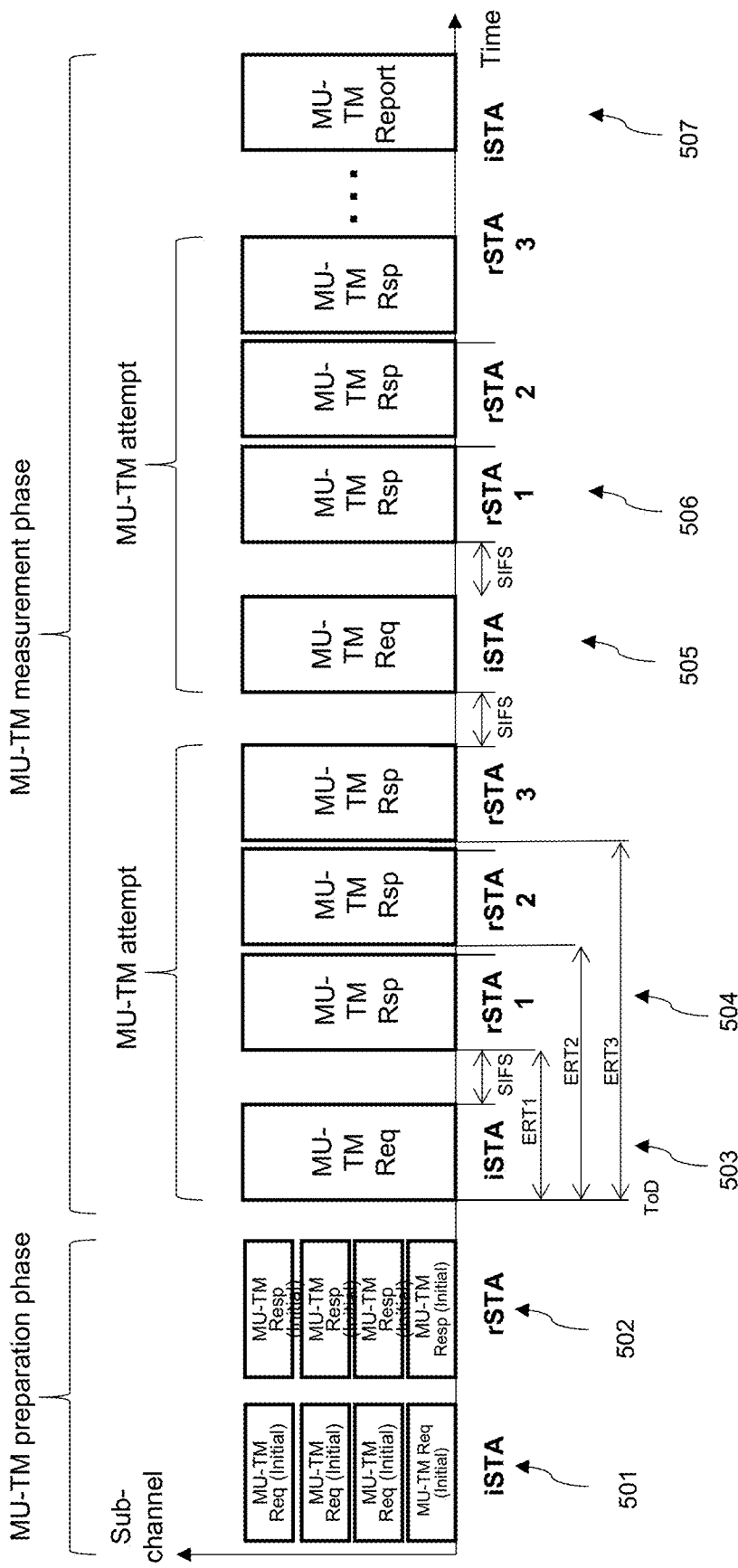
FIG. 5 shows an example of the MU-TM message exchange in the time-domain.

FIG. 5 illustrates an example of MU-TM message exchange from the time domain point of view. As shown therein, the steps in the time-domain include:

501. The MU-TM initiating station iSTA identifies the MU-TM capable responding stations (rSTA1, rSTA2 and rSTA3) in the coverage area and sends an initial MU-TM Request addressing to them for establishing the MU-TM OP to protect the following MU-TM message exchanges. In order to improve the timing measurement accuracy, the iSTA may duplicate the initial MU-TM Request transmission in the multiple 20 MHz bandwidth channels (such as in 80 MHz bandwidth) if they are available. The iSTA may specify in the initial MU-TM Request the resource units for receiving the initial MU-TM Response from responding stations and the expected response times (ERTs). Therefore the iSTA can control the reception of multiple initial MU-TM Responses from different rSTAs either over different channels at same time or on the same channel sequentially.

502. An MU-TM capable station (rSTA1, rSTA2, rSTA3) receives the initial MU-TM Request and sends an initial MU-TM Response in either primary 20 MHz channel or secondary channel according to the allocated resource units at the expected response time. In the example of FIG. 5, it shows the multiple initial MU-TM Responses are sent from different rSTAs over different channels simultaneously. Another option is to have the multiple initial MU-TM Responses being sent sequentially from rSTAs at different ERTs.

503. After receiving the initial MU-TM Response from rSTA1, rSTA2 and rSTA3, the iSTA sends the MU-TM Request to initiate the first timing measurement attempt in the 80 MHz bandwidth channel. The MU-TM Request addresses to the identified responding stations rSTA1, rSTA2 and rSTA3, and includes the expected responding times (ERTs) for the response messages sent from those STAs. The ERT1 for rSTA1 could be set to the transmission time of MU-TM Request+SIFS time. The ERT2 for rSTA2 could be set to the transmission time of MU-TM Request+SIFS time+the transmission time of MU-TM Response+the fixed time delay (Td). The ERT3 for rSTA3 could be set to the transmission time of MU-TM Request+SIFS time+2× transmission time of MU-TM Responses+2×Td.

The transmission time of MU-TM Request or Response is determined by the transmission rate the message size. The fixed time delay Td should be set to the value greater than the maximum propagation delay between the initiating station and any responding station so that two consecutive transmissions of MU-TM Responses would not collide each other in the time domain. For example, for coverage of 100 m from the iSTA, the Td could be set to 0.4 µs.

504. After receiving the MU-TM Request, the responding stations (rSTAs) will send the MU-TM Responses over the allocated RUs and at ERTs respectively. In this example, rSTA1 is expected to transmit its MU-TM Response over 80 MHz bandwidth at ERT1 (e.g., SIFS time). Therefore, it sends the MU-TM Response over 80 MHz channel first. Then rSTA2 and rSTA3 will send their MU-TM Responses over 80 MHz channel at their ERTs accordingly.

505. After completing the first MU-TM attempt with multiple responding stations, the iSTA may start second (or more) MU-TM attempt with those responding stations to get multiple timing measurement results. With every additional MU-TM attempt, the geo-position of iSTA can be updated and improved gradually.

506. The MU-TM capable responding stations rSTA1, rSTA2 and rSTA3 send their MU-TM Responses over 80 MHz channel at their ERTs respectively. With the multiple MU-TM measurements, the iSTA can average (or use other method) the measurements to improve the accuracy of the MU-TM geo-positioning mechanism.

In some embodiments, the iSTA may stop sending further MU-TM attempt if the difference between two consecutive RTD measurements are less than the given threshold.

507. The iSTA may calculate its position to the reference stations based on the timing measurement results, or send the timing measurement report to a location determination server through the AP which it associates with. The location server will then calculate the location information of the iSTA and send the information back.

In some embodiments, the iSTA may explicitly terminate the MU-TM measurement phase via sending a CF-End frame once the timing measurement completes or implicitly terminate via MU-TM OP time-out.

In some embodiments, to support the multi-user timing measurement mechanism, serval MU-TM messages are needed. To that end, an MU-TM capable responding station (e.g., AP) should broadcast the MU-TM support indication so that an MU-TM initiating station could easily identify and perform MU-TM based timing measurement with it. An MU-TM capable station may include the MU-TM support indication in the BSS Capability or the Neighbour BSS report. FIGS. 6A and 6B shows examples of MU-TM support indication in the HE Capability IE and Neighbour BSS report IE, respectively.

Figure 7A:
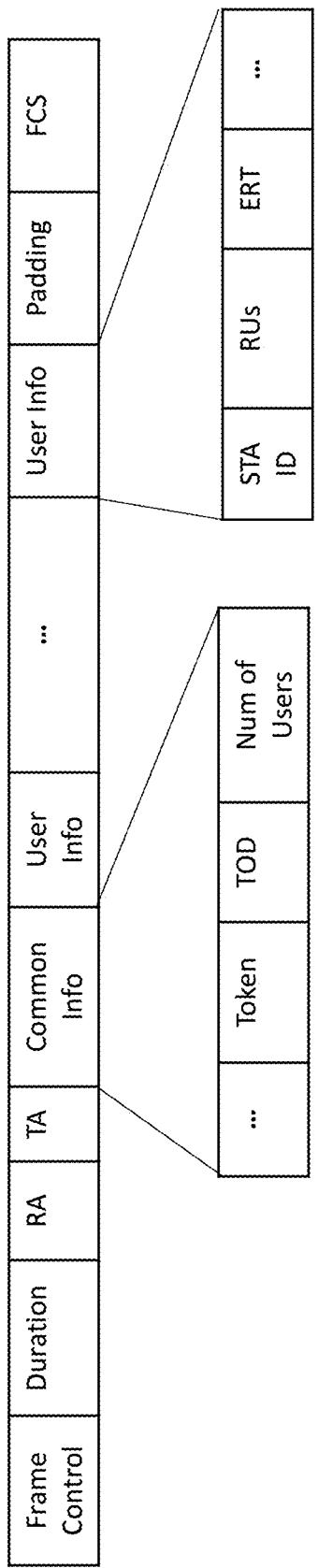
FIGS. 7A and 7B show examples of an MU-TM request format and an MU-TIM response format, respectively.
Figure 7B:
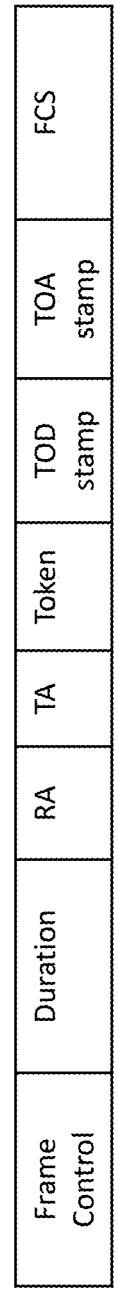

FIGS. 7A-7B illustrate examples of MU-TM message formats which can be used for either initial MU-TM Request/Response in the preparation phase or the MU-TM Request/Response in the timing measurement phase. The MU-TM Request can be a Null Data Packet Announcement (NDPA) like frame and the MU-TM Response can be a Null Data Packet (NDP) type of frame in the MU-TM measurement phase.

The MU-TM Request contains fields shown in FIG. 7A, which include:

Frame Control: This field is set to either Public Action management frame type or Control frame type for the MU-TM Request.

Duration: This field is set to the duration of multi-user timing measurements.

RA and TA: The receiving address (RA) is set to the broadcast address or a group address of responding STAs for MU-TM. The transmit address (TA) is set to the MAC address of this STA.

Common Information field: it may contain a token which is used to identify this MU-TM message exchanges; TOD is the time at which the MU-TM Request is transmitted (i.e. departed) from this station; Number of Users field indicates the number of user information followed within this message.

User Information: This field carries the information about the responding station, such as STA ID (such as MAC Address or AID), allocated resource units (RUs) for sending the MU-TM Response from rSTA, the expected response time (ERT) for the response message send from the rSTA, etc.

The MU-TM Response contains fields shown in FIG. 7B, which include:

Frame Control: This field is set to either Public Action management frame type or Control frame type.

Duration: This field is set to the modified duration of multi-user timing measurements, e.g., the received duration value from MU-TM Request minus the transmission time of MU-TM Request plus aSIFSTime.

RA and TA: The receiving address (RA) is set to the MAC address of the STA initiating MU-TM Request. The transmit address (TA) is set to the MAC address of this responding STA.

Token: This field is used to indicate which MU-TM Request is associated with by this Response. It is set to the value of Token received in the MU-TM Request.

TOD stamp: This field is set to the time at which the MU-TM Response is transmitted (e.g., departed) from this STA.

TOA stamp: This field is set to the time at which the MU-TM Request is received by (e.g., arrived at) this STA.

FCS: This field (frame check sequence) is used for the receiving station to check the error of the frame.

During the MU-TM measurement phase, an rSTA may send an NDP based MU-TM Response in an MU-TM attempt except for the last one. If an NDP based MU-TM Response is sent, no MAC frame is attached to the NDP based MU-TM Response. In the last MU-TM attempt, the rSTA shall include in the MU-TM Response the ToA (for example ToA1 for rSTA1) and ToD (for example, ToD1 for rSTA1) averaged with the ToA and ToD values in previous MU-TM attempts. Therefore the iSTA can apply the averaged ToA1 and ToD1 to calculate the RTD between iSTA and rSTA1.

After the MU-TM OP is established among the iSTA and multiple rSTAs, the iSTA may start the first MU-TM attempt with rSTAs. It may repeat the attempt multiple times to improve the timing measurement accuracy. As the information in the MU-TM Request would be same or similar in every MU-TM attempt, the iSTA may simplify the MU-TM Request to further improve MU-TM protocol performance.

In some embodiments, if the iSTA performs the MU-TM message exchanges with the same rSTAs as the initial MU-TM Request and uses similar parameters like RUs and ERTs, the iSTA can set the Number of Users to "0" (or other special value) to instruct rSTAs to derive the parameters from the setting in the previous MU-TM Request, and not include an individual User Info fields in this MU-TM Request. The rSTAs shall derive RUs, ERTs and other parameters from the previous MU-TM Request.

For example, ERT1($i$) for the ith MU-TM measurement can be derived as $$ERT1(i)=ERT1(i-1).$$

Here, ERT1($i$-1) are either included in the ($i$-1) MU-TM Request or further derived from previous request or the initial MU-TM Request. Similarly, ERT2($i$) and ERT3($i$) for ith MU-TM measurement attempt can be derived as $$ERT2(i)=ERT2(i-1), \text{ and}$$

$$ERT3(i)=ERT3(i-1).$$

Figure 8:
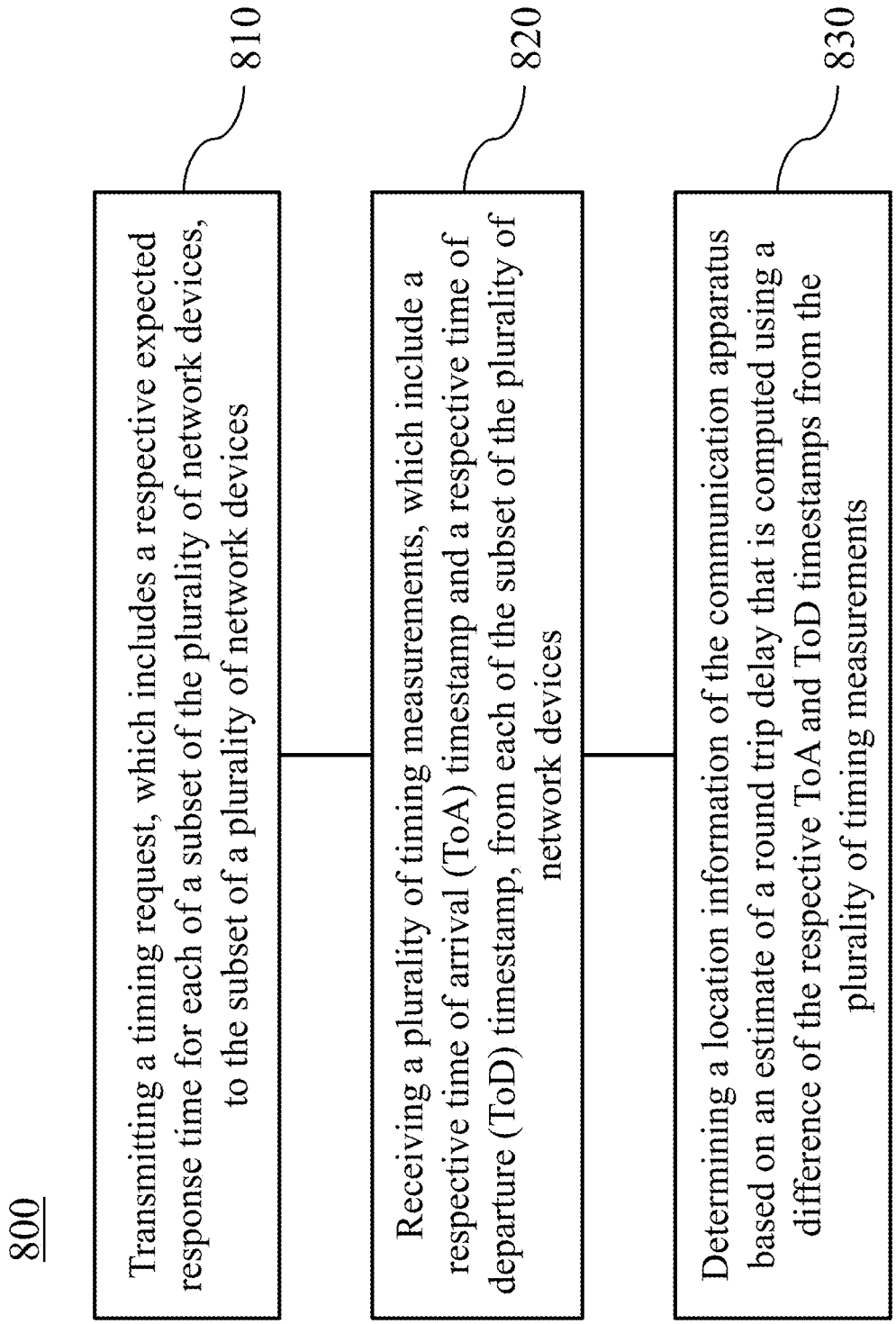
FIG. 8 shows an example of a wireless communication method.

FIG. 8 shows an example of a wireless communication method 800. The method 800 includes, at step 810, transmitting, by a communication apparatus, a timing request to a subset of a plurality of network devices, where the timing request comprises a respective expected response time for each of the subset of the plurality of network devices. In some embodiments, the timing request identifies a transmission resource associated with each of the subset of the plurality of network devices. The communication apparatus may be, for example, a smartphone, a laptop, a tablet, an Internet of Things (IoT) device, or another hardware platform capable of wireless communication.

The method 800 includes, at step 820, receiving, at a plurality of times, a plurality of timing measurements from each of the subset of the plurality of network devices, where each of the plurality of times is based on the corresponding expected response time, and the plurality of timing measurements comprises a respective time of arrival (ToA) timestamp and a respective time of departure (ToD) timestamp. For example, the frame formats shown in FIGS. 7A and 7B may be used for the MU-TM request and the MU-TM response, respectively.

The method 800 includes, at step 830, determining a location information of the communication apparatus based on an estimate of a round trip delay that is computed using a difference of the respective ToA and ToD timestamps from the plurality of timing measurements. Some example equations for the location determination are described in the present document.

In some embodiments, the method 800 further includes transmitting, to the plurality of network devices, a plurality of initial timing requests on a plurality of frequency channels, and receiving a plurality of initial timing responses from the subset of the plurality of network devices on a respective frequency channel of the plurality of frequency channels, as described in the context of the MU-TM preparation phase. In an example, the plurality of initial timing requests is transmitted in an identical timeslot.

In some embodiments, the method 800 further includes repeating steps 810 and 820 a number of times, where a ToA timestamp and a ToD timestamp is received each of the number of times from each of the subset of the plurality of network devices, and refining the estimate of the round trip delay based on a plurality of the ToA timestamps and ToD timestamps.

In some embodiments, the method 800 further includes transmitting, after the steps 810 and 820 are repeated the number of times, a termination message.

In some embodiments, the method 800 further includes transmitting a report comprising the location information of the communication apparatus to the subset of the plurality of network devices.

Figure 9:
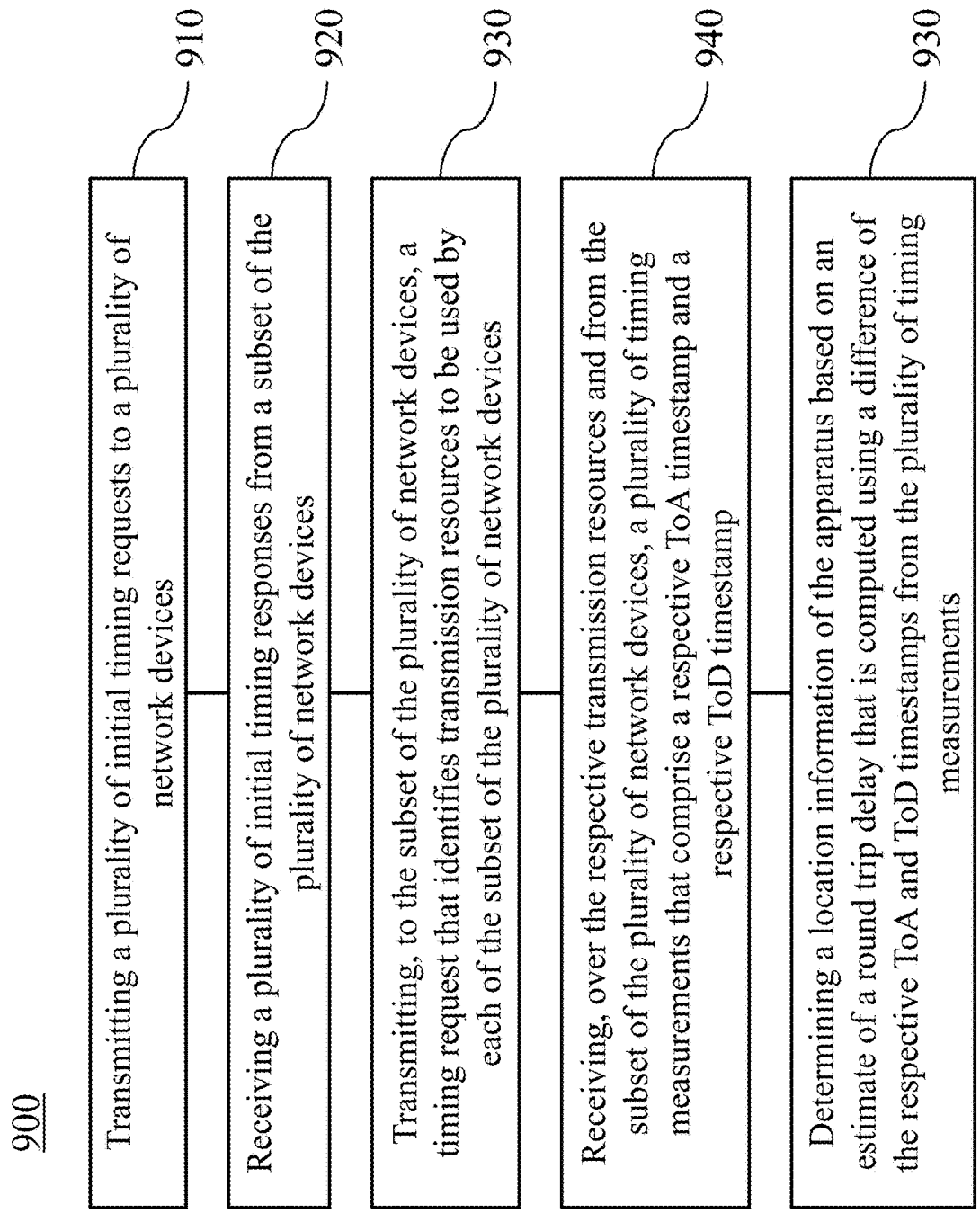
FIG. 9 shows an example of another wireless communication method.

FIG. 9 shows an example of a wireless communication method, in accordance with some embodiments of the presently disclosed technology. This example includes some features and/or steps that are similar to those shown in FIG. 8, and described above. At least some of these features and/or components may not be separately described in this section. The method 900 includes, at step 910, transmitting a plurality of initial timing requests to a plurality of network devices.

The method 900 includes, at step 920, receiving a plurality of initial timing responses from a subset of the plurality of network devices.

The method 900 includes, at step 930, transmitting a timing request to the subset of the plurality of network devices, where the timing request identifies transmission resources to be used by each of the subset of the plurality of network devices.

The method 900 includes, at step 940, receiving, over the respective transmission resources, a plurality of timing measurements from the subset of the plurality of network devices, where the plurality of timing measurements comprises a respective ToA timestamp and a respective ToD timestamp.

The method 900 includes, at step 950, determining a location information of the apparatus based on an estimate of a round trip delay that is computed using a difference of the respective ToA and ToD timestamps from the plurality of timing measurements.

Figure 10:
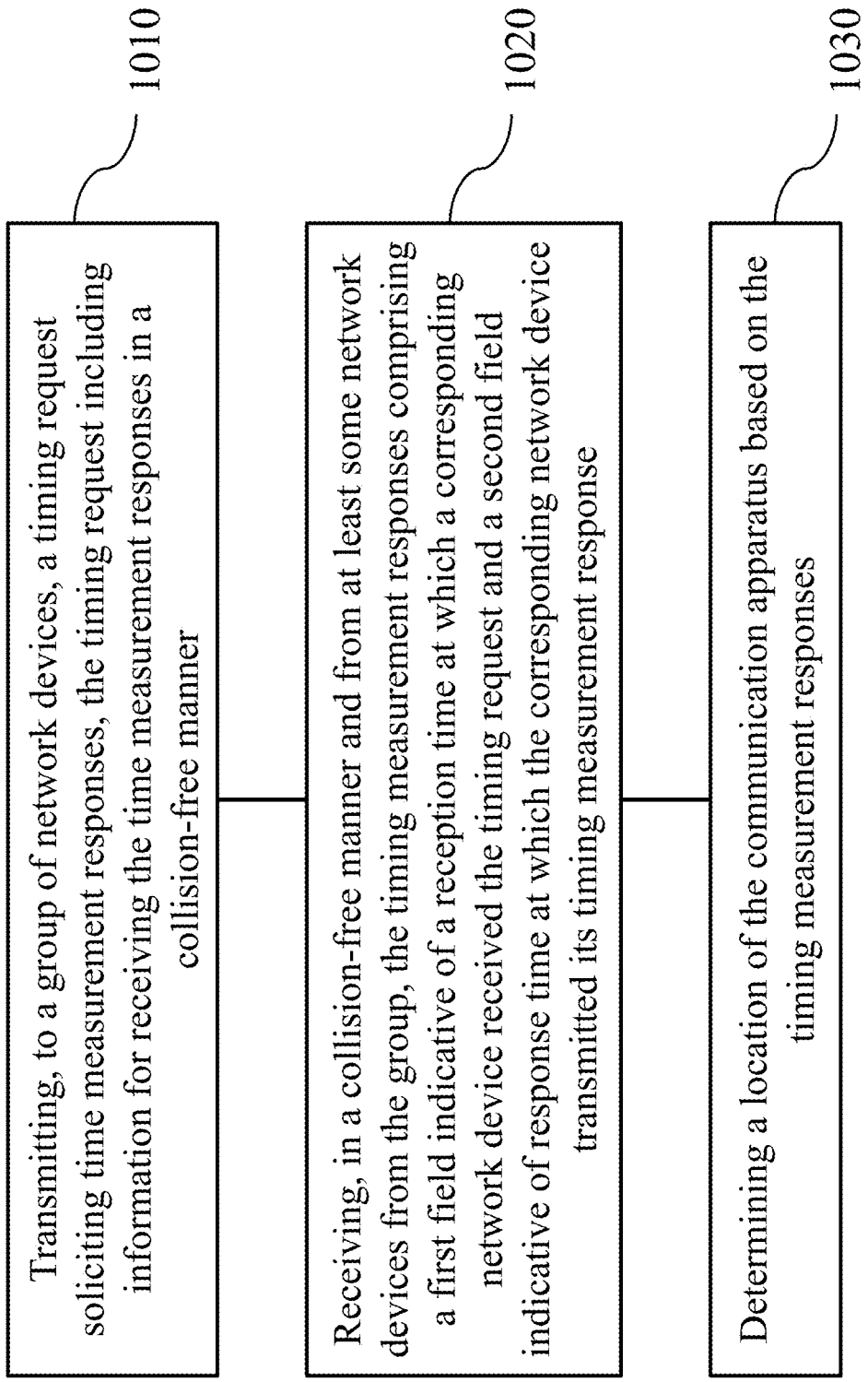
FIG. 10 shows an example of yet another wireless communication method.

FIG. 10 shows an example of a wireless communication method, in accordance with some embodiments of the presently disclosed technology. This example includes some features and/or steps that are similar to those shown in FIGS. 8 and 9, and described above. At least some of these features and/or components may not be separately described in this section. The method 1000 includes, at step 1010, transmitting, to a group of network devices, a timing request soliciting time measurement responses, the timing request including information for receiving the time measurement responses in a collision-free manner. In some embodiments, the collision-free manner comprises time-division multiplexing (TDM). In some embodiments, the collision-free manner comprises frequency-domain multiplexing (FDM). In some embodiments, other collision-free communication techniques such as code division multiplexing may be used.

The method 1000 includes, at step 1020, receiving, in the collision-free manner, the timing measurement responses from at least some network devices from the group, where each timing measurement response includes a first field indicative of a reception time at which a corresponding network device received the timing request and a second field indicative of response time at which the corresponding network device transmitted its timing measurement response.

The method 1000 includes, at step 1030, determining a location of the communication apparatus based on the timing measurement responses.

In some embodiments, the method 1000 further includes repeating steps 1010 and 1020 a number of times, where the first and second fields are received the number of times from the at least some network devices from the group, and refining the location of the communication apparatus based on the first and second fields that were received the number of times.

In some embodiments, the method 1000 further includes transmitting, to the group of network devices, a report comprising the location of the communication apparatus.

Figure 11:
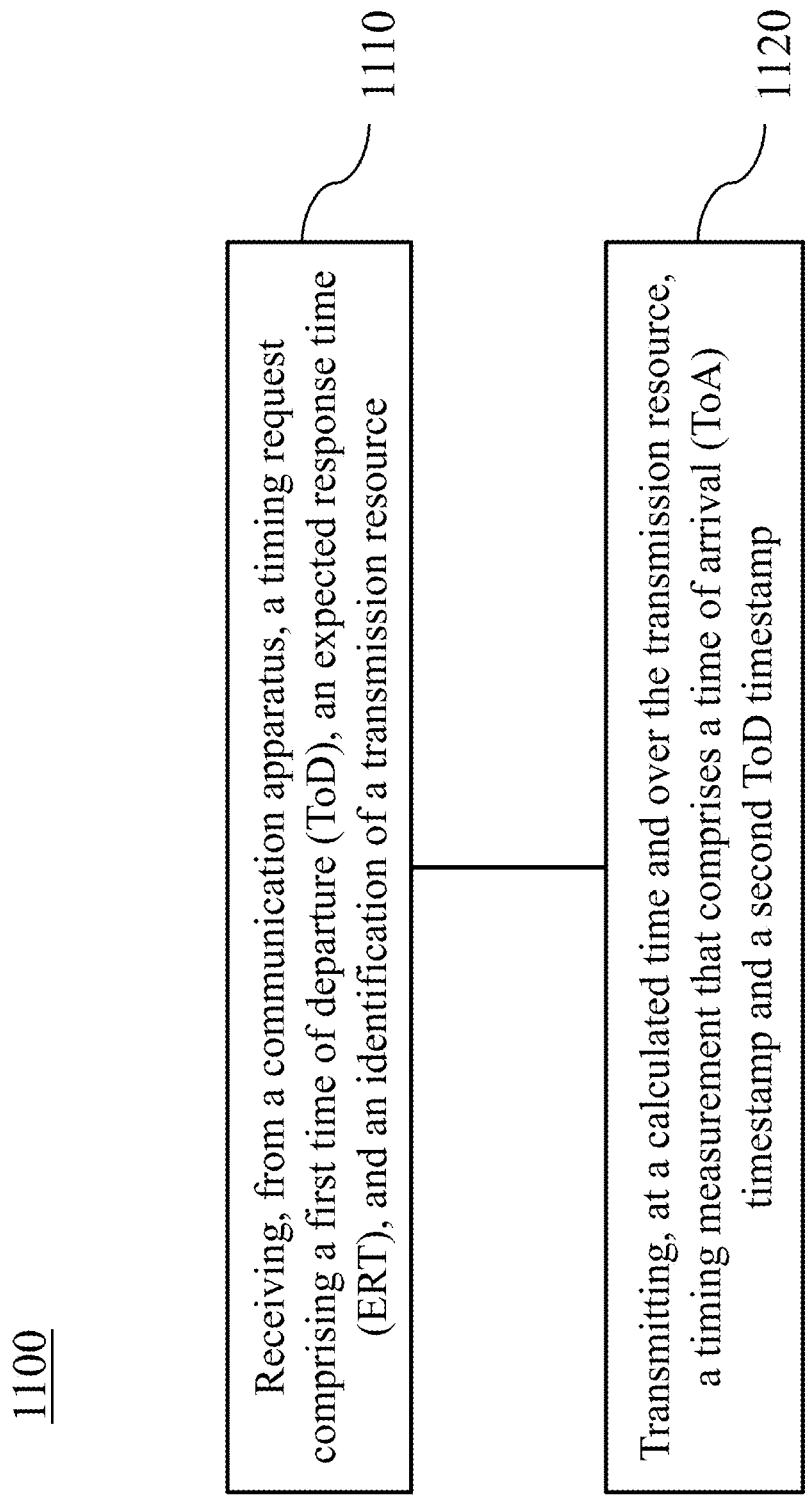
FIG. 11 shows an example of yet another wireless communication method.

FIG. 11 shows an example of a wireless communication method, in accordance with some embodiments of the presently disclosed technology. This example includes some features and/or steps that are similar to those shown in FIGS. 8, 9 and 10, and described above. At least some of these features and/or components may not be separately described in this section. The method 1100 includes, at step 1110, receiving, from a communication apparatus, a timing request comprising a first time of departure (ToD), an expected response time (ERT), and an identification of a transmission resource.

The method 1100 includes, at step 1120, transmitting, at a calculated time and over the transmission resource, a timing measurement that comprises a time of arrival (ToA) timestamp and a second ToD timestamp, where the ToA timestamp corresponds to when the timing request was received, where the second ToD timestamp corresponds to the calculated time, and where the second ToD is equal to a sum of the ToA timestamp and the ERT.

In yet another exemplary aspect, another method based on the embodiments of the disclosed technology enable a wireless system to implement a timing measurement protocol between a wireless station and multiple wireless reference stations for geographic-positioning the wireless station, and may include transmitting a timing measurement request to a plurality of wireless reference stations simultaneously and receiving their timing measurement responses sequentially.

In yet another exemplary aspect, another method based on the embodiments of the disclosed technology enable a wireless system to initiate the timing measurement with a plurality of wireless reference stations, and to subsequently perform a multi-user timing measurement preparation phase and a timing measurement phase.

In yet another exemplary aspect, another method based on the embodiments of the disclosed technology enable a wireless system to identify MU-TM-capable wireless reference stations, and set up the timing measurement period with those wireless reference stations in the multi-user timing measurement preparation phase. The method may include, in the initial multi-user timing measurement, transmitting a request that includes the identified wireless reference stations, allocated resource units and expected response time for transmitting the timing measurement responses from a plurality of wireless reference stations. A plurality of wireless reference stations transmit the timing measurement responses over the allocated resource unit(s) at the specified time slot.

In yet another exemplary aspect, another method based on the embodiments of the disclosed technology enable a wireless system to instruct a plurality of responding wireless reference stations to transmit a timing measurement response at the specified time so that a plurality of timing measurement responses from a plurality of wireless reference stations can be distributed in time domain to avoid signal collision at the receiving side.

In yet another exemplary aspect, another method based on the embodiments of the disclosed technology enable a wireless system to repeat the same multi-user timing measurement procedure with the same plurality of wireless reference stations. With a plurality of timing measurements from a plurality of wireless reference stations, the timing measurement initiating wireless station can improve the geographic-positioning accuracy progressively. The timing measurement initiating wireless station may stop the timing measurement procedure once the measurement result is satisfied.

Figure 12:
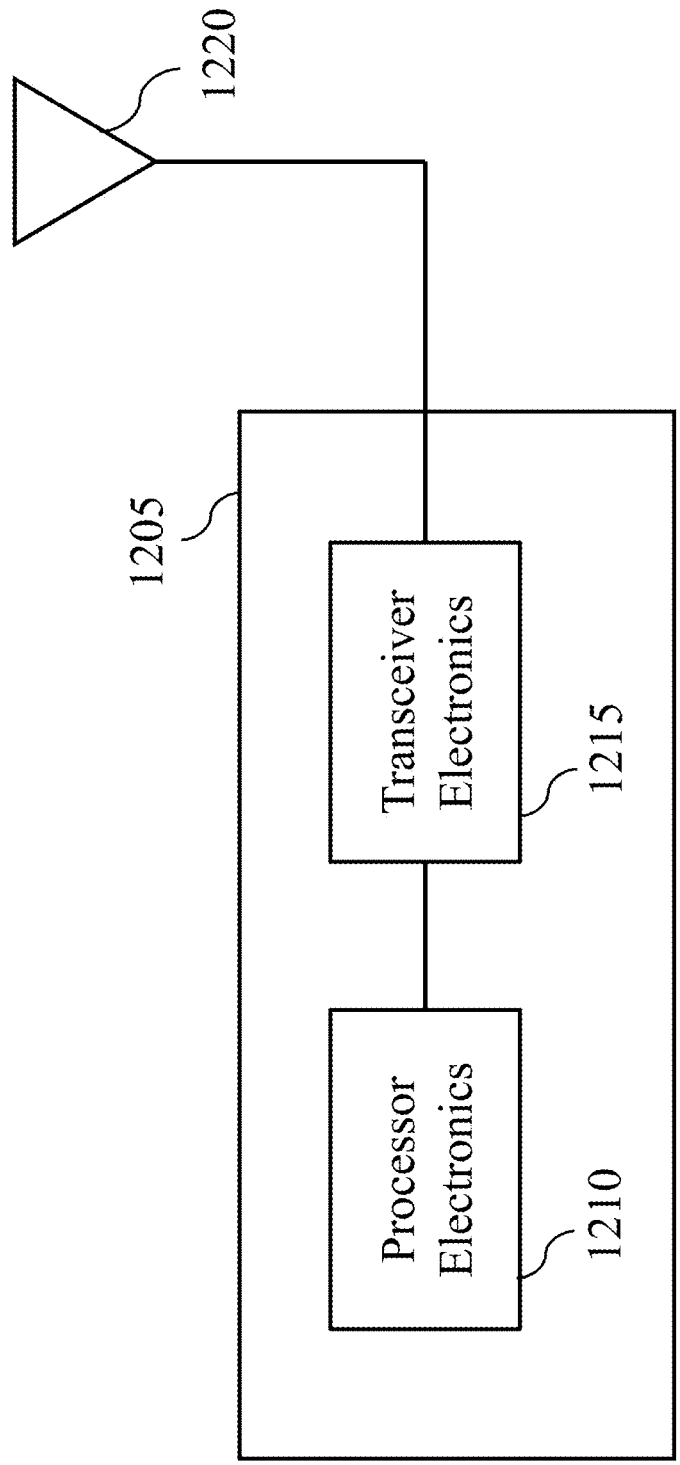
FIG. 12 is a block diagram representation of a portion of a communication apparatus.

FIG. 12 is a block diagram representation of a portion of a communication apparatus, in accordance with some embodiments of the presently disclosed technology. The apparatus 1205 can include processor electronics 1210 such as a microprocessor that implements one or more of the techniques presented in this document. The apparatus 1205 can include transceiver electronics 1215 to send and/or receive wireless signals over one or more communication interfaces such as antenna(s) 1220. The apparatus 1205 can include other communication interfaces for transmitting and receiving data. Apparatus 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the apparatus 1205.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   (a) transmitting, by a communication apparatus, a timing request to a subset of a plurality of network devices, wherein the timing request comprises a respective expected response time for each of the subset of the plurality of network devices, and wherein the expected response time corresponds to a transmission time of a timing measurement that is received from the corresponding network device of the plurality of network devices;
   (b) receiving, at a plurality of times, a plurality of timing measurements from each of the subset of the plurality of network devices, wherein each of the plurality of times is based on the corresponding expected response time, and the plurality of timing measurements comprises a respective time of arrival (ToA) timestamp and a respective time of departure (ToD) timestamp;
   (c) determining a location information of the communication apparatus based on an estimate of a round trip delay that is computed using a difference of the respective ToA and ToD timestamps from the plurality of timing measurements; and
   repeating steps (a) and (b) a number of times, wherein a ToA timestamp and a ToD timestamp is received each of the number of times from each of the subset of the plurality of network devices, and wherein the round trip delay is computed for each of the number of times for each of the subset of the plurality of network devices,
   wherein the number of times is based on comparing differences of consecutive round trip delays for each of the subset of the plurality of network devices to a threshold.

2. The method of claim 1, further comprising:
   transmitting, to the plurality of network devices, a plurality of initial timing requests on a plurality of frequency channels; and
   receiving a plurality of initial timing responses from the subset of the plurality of network devices on a respective frequency channel of the plurality of frequency channels.

3. The method of claim 2, wherein the plurality of initial timing requests is transmitted in an identical timeslot.

4. The method of claim 1, further comprising:
   refining the estimate of the round trip delay based on a plurality of the ToA timestamps and ToD timestamps.

5. The method of claim 4, further comprising:
   transmitting, after the steps (a) and (b) are repeated the number of times, a termination message.

6. The method of claim 1, wherein the timing request identifies a transmission resource associated with each of the subset of the plurality of network devices.

7. The method of claim 6, wherein each of the plurality of timing measurements is received on the respective transmission resource identified in the timing request.

8. The method of claim 1, further comprising:
   transmitting a report comprising the location information of the communication apparatus to the subset of the plurality of network devices.

9. The method of claim 1, wherein the threshold is distinct for each of the subset of the plurality of network devices.

10. An apparatus for wireless communication, comprising:
    a processor; and
    a non-transitory memory with instructions thereon, wherein the instructions upon execution by the processor, cause the processor to:
    (a) transmit a plurality of initial timing requests to a plurality of network devices, wherein each of the plurality of initial timing requests comprises an expected response time corresponding to a transmission time of a timing measurement that is received from a corresponding network device of a subset of the plurality of network devices;
    (b) receive a plurality of initial timing responses from the subset of the plurality of network devices;
    (c) transmit a timing request to the subset of the plurality of network devices, wherein the timing request identifies transmission resources to be used by each of the subset of the plurality of network devices;
    (d) receive, over the respective transmission resources, a plurality of timing measurements from the subset of the plurality of network devices, wherein the plurality of timing measurements comprises a respective time of arrival (ToA) timestamp and a respective time of departure (ToD) timestamp;
    (e) determine a location information of the apparatus based on an estimate of a round trip delay that is computed using a difference of the respective ToA and ToD timestamps from the plurality of timing measurements; and
    repeat steps (a) and (b) a number of times, wherein a ToA timestamp and a ToD timestamp is received each of the number of times from each of the subset of the plurality of network devices, and wherein the round trip delay is computed for each of the number of times for each of the subset of the plurality of network devices,
    wherein the number of times is based on comparing differences of consecutive round trip delays for each of the subset of the plurality of network devices to a threshold.

11. The apparatus of claim 10, wherein the plurality of initial timing requests are transmitted on each of a plurality of frequency channels.

12. The apparatus of claim 11, wherein the plurality of initial timing responses are received on the corresponding each of the plurality of frequency channels.

13. The apparatus of claim 10, wherein the plurality of initial timing requests are transmitted in an identical timeslot.

14. The apparatus of claim 10, wherein the processor is further caused to:
    refine the estimate of the round trip delay based on a plurality of the ToA timestamps and ToD timestamps.

15. The apparatus of claim 14, wherein the processor is further caused to:
    transmit, after the steps (c) and (d) are repeated the number of times, a termination message.

16. The apparatus of claim 10, wherein the processor is further caused to:
    transmit a report comprising the location information of the apparatus to the subset of the plurality of network devices.

17. A computer-readable program medium having code stored thereon, the code, when executed by a processor of a communication apparatus, causing the processor to implement a method for wireless communication, the method comprising:
    (a) transmitting, to a group of network devices, a timing request soliciting time measurement responses, the timing request including information for receiving the time measurement responses in a collision-free manner, the information comprising an expected response time corresponding to a transmission time of a timing measurement response that is received from a corresponding network device of at least some network devices from the group;

(b) receiving, in the collision-free manner, the timing measurement responses from the at least some network devices from the group, wherein each timing measurement response includes a first field indicative of a reception time at which a corresponding network device received the timing request and a second field indicative of response time at which the corresponding network device transmitted its timing measurement response;

(c) determining a location of the communication apparatus based on the timing measurement responses;

repeating steps (a) and (b) a number of times, wherein a ToA timestamp and a ToD timestamp is received each of the number of times from each of the subset of the plurality of network devices, and wherein the round trip delay is computed for each of the number of times for each of the subset of the plurality of network devices, wherein the number of times is based on comparing differences of consecutive round trip delays for each of the subset of the plurality of network devices to a threshold.

18. The computer-readable program medium of claim 17, wherein the collision-free manner comprises time-division multiplexing (TDM).

19. The computer-readable program medium of claim 17, wherein the collision-free manner comprises frequency-domain multiplexing (FDM).

20. The computer-readable program medium of claim 17, the method further comprising:

refining the location of the communication apparatus based on the first and second fields that were received the number of times.

21. The computer-readable program medium of claim 17, the method further comprising:

transmitting, to the group of network devices, a report comprising the location of the communication apparatus.

\* \* \* \* \*